United States Patent [19]

Lary et al.

[11] Patent Number: 5,386,524

[45] Date of Patent: Jan. 31, 1995

[54] SYSTEM FOR ACCESSING INFORMATION IN A DATA PROCESSING SYSTEM

[75] Inventors: Richard Lary, Colorado Springs, Colo.; Robert Willard, Andover; Catharine Van Ingen, Shrewsbury, both of Mass.; David Thiel, Colorado Springs, Colo.; William Watson, Redmond, Wash.; Barry Rubinson, Danville, Calif.; Verell Boaen, Groton, Mass.

[73] Assignee: Digital Equipment Corporation, Maynard, Mass.

[21] Appl. No.: 869,668

[22] Filed: Apr. 16, 1992

[51] Int. Cl.⁶ .................. G06F 12/00; G06F 12/06; G06F 13/00

[52] U.S. Cl. .................. 395/400; 395/275; 364/239.7; 364/255.1; 364/255.7; 364/DIG. 1

[58] Field of Search .............. 375/400, 425, 275, 250

[56] References Cited

U.S. PATENT DOCUMENTS

| | | | |
|---|---|---|---|
| 3,487,375 | 12/1969 | Macon et al. | 395/375 |
| 4,035,777 | 7/1977 | Moreton | 395/325 |
| 4,387,427 | 6/1983 | Cox et al. | 395/650 |
| 4,419,728 | 12/1983 | Larson | 395/325 |
| 4,449,182 | 5/1984 | Rubinson et al. | 395/250 |
| 4,654,777 | 3/1987 | Nakamura | 375/400 |
| 4,777,595 | 10/1988 | Strecker et al. | 395/200 |
| 4,821,185 | 4/1989 | Esposito | 395/275 |
| 4,829,425 | 5/1989 | Bain, Jr. et al. | 395/275 |
| 4,849,875 | 7/1989 | Fairman et al. | 395/400 |
| 4,891,752 | 1/1990 | Fairman et al. | 395/400 |
| 4,897,786 | 1/1990 | Pimm et al. | 395/325 |
| 4,939,636 | 7/1990 | Nakagawa et al. | 395/425 |
| 4,947,366 | 8/1990 | Johnson | 395/275 |
| 4,956,771 | 9/1990 | Neustaedter | 395/650 |
| 4,958,277 | 9/1990 | Hill et al. | 395/325 |
| 4,975,829 | 12/1990 | Clarey et al. | 395/275 |
| 5,101,339 | 3/1992 | Fairman et al. | 395/400 |

FOREIGN PATENT DOCUMENTS 0206657 12/1986 European Pat. Off. .

OTHER PUBLICATIONS

Collier et al., "Queued Communication Interface"; IBM Technical Disclosure Bulletin vol. 19, No. 1, Jun. 1976, N.Y., US, pp. 217-221.

"CSR Architecture (DMA Processors), and Optional Framework for DMA-Processors Architectures" Draft 1.0 by P1212 Working Group of the Microprocessor Standards Committee, Standards Subcommittee of the Technical Committee on Microprocessors and Microcomputers of the IEEE Computer Society, Jan. 31, 1990 at pp. 4–12.

Primary Examiner—Joseph L. Dixon
Assistant Examiner—Michael A. Whitfield
Attorney, Agent, or Firm—Cesari and McKenna

[57] ABSTRACT

A memory mapping system for use by a port adapter in a computer facilitates access to named data buffers in host memory. The system generally comprises a mechanism that enables the adapter to efficiently translate the data buffer name to physical address locations in host memory without knowledge of the memory management policies of the computer. Specifically, the system includes various data structures and pointers that allow the port adapter to view host memory in "port pages" when accessing memory locations of a named data buffer. The data locations are virtually, but not physically, contiguous and the invention provides efficient identification of the physical addresses of the locations.

11 Claims, 11 Drawing Sheets

5,386,524

SYSTEM FOR ACCESSING INFORMATION IN A DATA PROCESSING SYSTEM

FIELD OF THE INVENTION

This invention relates generally to accessing information in a data processing system and, more specifically, to data transfers between a host memory of a computer and a hardware port adapter.

BACKGROUND OF THE INVENTION

A data processing system typically comprises a host computer connected to one or more nodes, e.g., other host computers or peripheral devices, via an interconnect medium. The host computer comprises a number of basic elements including a central processing unit (CPU), a host memory and at least one input/output (I/O) port adapter that physically connects the computer to the interconnect medium. In general, the interconnect medium is a network or I/O bus and the peripheral devices are typically disks, tapes and communications equipment.

The host computer is functionally organized by an operating system comprising a collection of software modules that control the execution of computer programs and manage the transfer of information among the elements of the computer. The host memory stores computer program information, i.e., data and instructions, in addressable storage locations. The CPU then executes the programs by fetching and interpreting the instructions, and processing the data in accordance with the instructions.

Program-generated addresses are called virtual addresses because they refer to the contiguous logical, i.e., virtual, address space referenced by a computer program. In contrast, the physical address space consists of the actual locations where information is stored in host memory. A host computer with a "virtual" memory allows programs to address more memory than is physically available. In addition, an advantage of virtual addressing is that the addresses that the program uses appear contiguous to the program even though they may reference non-contiguous physical locations in host memory. This facilitates dynamic allocation of additional physical addresses, as needed.

The operating system manages the virtual memory so that the program operates as if it is loaded into contiguous physical locations. One common scheme for managing virtual memory is to divide the program and host memory into equal-sized blocks or pages so that each program page fits into a memory page. A system disk participates in the implementation of the "virtual" memory by storing pages of the program not currently in host memory. The loading of pages between the disk and host memory (paging) is managed by the operating system.

When a program references an address in virtual memory, the CPU calculates the corresponding host memory physical address in order to access the information (hereinafter referred to generally as data). The CPU typically includes memory management hardware to hasten the translation of the virtual address to a physical address. Specifically, for each program there is a page table containing a list of mapping entries, i.e., page table entries (PTEs), which, in turn, contain the physical address of each page of the program and a valid bit denoting whether the PTE is valid. Each PTE thus indicates whether the program page is in host memory. If not, the PTE typically specifies where to find a copy of the page on the disk.

The operating system includes at least one port driver that controls at least one I/O port adapter when performing I/O operations, such as the transfer of data between the host computer and a node. In order to efficiently perform these operations, the port driver and port adapter exchange messages, e.g., commands and responses, via linked queues, which are locations in host memory organized to provide data structures. Specifically, the driver sends a command to the adapter to perform an operation. The adapter interprets the command and forwards it to the appropriate node on the medium. The adapter then returns a response to the driver.

An example of an I/O operation command to which the invention is generally directed is a request to transfer data from the computer memory to a disk (and vice versa) via the port adapter. The present invention is particularly directed to increasing the throughput of the data processing system by allowing the disk, in conjunction with the adapter, to access the data in host memory in a manner that optimizes disk performance and minimizes CPU and I/O port adapter overhead. However, the present invention is also directed to bulk data transfer requests between two host computers. The request typically includes information as to the locations in host memory where the requested data is stored. For a virtual memory computer, these locations, called the user data buffer, are typically, but not necessarily, contiguous in the computer's virtual address space, but not necessarily contiguous in its physical address space. That is, portions of the data buffer may be scattered throughout physical host memory. Although virtual addressing of the user data buffer facilitates program generation, such addressing is cumbersome from the point of view of the I/O port adapter.

Specifically, the user data buffer may be identified by a name, i.e., a named data buffer, and its location in virtual memory is identified by a buffer descriptor. An example of a named data buffer is disclosed in U.S. Pat. No. 4,777,595 titled, APPARATUS FOR TRANSFERRING BLOCKS OF INFORMATION FROM ONE NODE TO A SECOND NODE IN A COMPUTER NETWORK, by Strecker et al. A buffer descriptor table resident in host memory contains an array of buffer descriptors, each defining a data buffer. Each buffer descriptor contains a virtual address pointer to an entry in the page table, i.e., a PTE, and each PTE, in turn, contains the location of a page of physical memory. Thus, the port adapter uses the buffer name, the buffer descriptor, and the page table to access a named data buffer in host memory.

When the port adapter forwards a request-to-store-data command to the disk, the command includes the name of the data buffer. Later, the disk returns a derivative of the command to the adapter that requests a portion of the data to be stored. The derivative command also includes the name of the data buffer. Using the name, the adapter accesses the buffer descriptor table, acquires a pointer to the appropriate PTE, and eventually identifies the physical location of the buffer in host memory. The port adapter then retrieves the data directly from the buffer location, sends it to the disk and subsequently notifies the port driver.

To summarize, because the buffer descriptor contains a virtual address pointer to the "virtual memory" data buffer, the adapter must translate the virtual address of the pointer to a physical address prior to locating the buffer in host memory. Accordingly, the adapter must access the page table in host memory. This results in an increase in the time and processing steps, e.g., at least three memory access operations, required to access a buffer location in memory.

Furthermore, these processing steps must typically be performed for each data transfer to host memory. For the example illustrated above, the node may retrieve the requested data in multiple transfers in order to complete the I/O operation or "transaction". The port adapter is thus required to frequently access the buffer descriptor table and the page table in host memory to determine the locations for accessing the data in the buffer, even though it is responding to a single command from the port driver.

Alternatively, the buffer descriptor may contain a pointer to a "scatter-gather" pointer list, which may comprise a list of arbitrary length and arbitrarily aligned address pairs used to find a virtual memory data buffer. A scatter-gather list is particularly useful for data transactions involving disks because it enables the transfer of data, in one I/O transaction, from non-contiguous locations in host memory to contiguous locations on disk, and vice versa. Because the elements of the list may have a non-fixed, arbitrary length, the port adapter must process each element to find the actual location within the buffer, thereby increasing overhead.

Therefore, it is desirable to provide a system for accessing a named data buffer that avoids the foregoing difficulties by allowing efficient transfer of data between a host entity, such as a computer, and an external entity, such as a peripheral disk.

In addition, it is desirable to provide a system that incorporates a memory mapping technique for efficiently translating the name of a named data buffer to the actual location of the data in the host memory.

Furthermore, it is desirable to provide a memory mapping system that is not specific to the host entity architecture, thereby obviating any knowledge of the memory management policies on behalf of the external entity.

SUMMARY OF THE INVENTION

Briefly, the system in accordance with the invention provides, in effect, a memory mapping technique for use by the port adapter that facilitates access to named data buffers in host memory, thereby reducing the overhead imposed by, among other things, multiple page table accesses. A named data buffer comprises memory locations that are typically contiguous in the computer's virtual address space, but not necessarily contiguous in either its physical or virtual address space. The memory mapping system generally comprises a translation mechanism that could be implemented in hardware or software that enables the adapter to efficiently translate the data buffer name to the physical address locations in host memory without knowledge of the memory management policies of the host computer. This is because the translation mechanism is not specific to the host CPU or operating system architecture.

Specifically, the mechanism includes various data structures and pointers that allow the adapter to "view" host memory in "port pages" when accessing data buffer locations therein. Although independent of the page size as viewed by the CPU, the size of a port page is typically smaller than a buffer and typically a sub-multiple of or equal to the CPU page size; also, because the buffer is typically non-contiguous in physical host memory, a named data buffer may span multiple port pages.

The data structures and associated pointers may include: (i) a buffer descriptor leaf table (BDLT), which is the base structure used to locate a named data buffer. The BDLT contains an array of buffer descriptor leaf pointers (BDL_PTRs), each of which point to a buffer descriptor leaf (BDL); (ii) a BDL, which contains an array of buffer descriptors; and (iii) a buffer descriptor that contains information describing the location of data in the named buffer and associated control information specifying how the port adapter can use the location information.

In operation, the port adapter receives a command from the port driver or node specifying a particular data transaction. The command includes a buffer name, the length of the transaction, and a relative starting location of the transaction within the buffer. The port adapter then uses the contents of the buffer name to index into the buffer descriptor structures. Specifically, the adapter obtains a BDLT_IDX field from the buffer name to index into the BDLT and access a BDLT entry, i.e., a BDL_PTR. The BDL_PTR identifies the appropriate BDL structure from among many similar structures. The port adapter then indexes into the BDL with a BDL_IDX field that is also obtained from the buffer name. This leads the adapter to a buffer descriptor.

The buffer descriptor includes, inter alia, address pointers and offsets to the named data buffer. The contents of the buffer descriptor, together with the offset and length transaction identifiers included in the command, provide the port adapter with all the information needed to access the data locations in the named data buffer.. Moreover, the contents of the buffer descriptor may be "cached", i.e. maintained, in the port adapter's buffer memory in accordance with the enclosed control information; this enables the adapter to minimize accesses to host memory to obtain the buffer location information.

Specifically, the buffer descriptor includes either at least one address pointer to a port page or an address of a physically contiguous packed array in host memory; that address pointer is a root buffer pointer (ROOT_PTR). Interpretation of the address contents of the ROOT_PTR is dependent upon the amount of data transferred; the latter, in turn, is denoted by a TYPx field. As noted above, the named buffer may also span multiple port pages. Therefore, the ROOT_PTR may be the first pointer in a possible hierarchy of buffer pointers (BUF_PTRs) used to locate the buffer.

For example, a first type of root pointer, referred to as a TYP0 ROOT_PTR, may contain the address of a port page of the data buffer; a second type of root pointer, TYP1 ROOT_PTR, may contain the address of a packed array of TYP0 BUF_PTRs; and a third type of root pointer, TYP2 ROOT_PTR, may contain the address of a packed array of TYP1 BUF_PTRs. A common situation involving the transfer of data to a named buffer that spans two port pages is handled by two TYP0 ROOT_PTRs. In contrast, a fourth type of root pointer, TYP3 ROOT_PTR, may contain the address of an array of length-address pairs, i.e., a scatter-gather array, used to locate various locations or "segments" within various port pages. When used in conjunction with transfer and page offset identifiers, the TYPx ROOT_PTR arrangement efficiently supports large data transfers and enables the adapter to efficiently access data locations in the named data buffer.

An advantage of the invention is that the memory mapping system minimizes the levels of indirection needed to locate a data buffer in host memory. Specifically, in the common cases of utilizing cached TYP0 ROOT_PTRs, the adapter need perform only one memory operation to acquire a buffer descriptor once the buffer name is obtained from a command of a particular transaction. Thereafter, for the duration of the transaction, the adapter has no need to access host memory to obtain the physical memory address information, since the contents of the buffer descriptor structures may be cached in the adapter's buffer memory. This efficiently supports out-of-order or partial data transfers because many transactions require multiple data transfers to complete.

The named buffers and buffer descriptor structures typically occupy non-contiguous addresses (relative to each other) in host memory; accordingly, their locations may be allocated dynamically by the port driver. The adapter uses physical addresses to locate the buffers and structures; thus, the adapter is not required to perform virtual address translations. Finally, for a host computer configuration including more than one adapter, the buffer descriptor arrangement supports accesses concurrently or non-coherently to the structures and data buffers by all adapters.

Therefore, in accordance with the invention as embodied and broadly described herein, a system is provided for accessing data located in named data buffers in a host memory of a host computer including a CPU and an I/O port adapter connected to an external node. The data is accessed by the adapter in response to a command received from a port driver operating system module executed by the CPU or from the node. The data buffer generally comprises non-contiguous addressable storage locations in the host memory. The system of the invention comprises: a first segment of host memory containing contiguous addressable storage locations for storing a plurality of descriptors, each descriptor containing address information identifying the location of one of the named data buffers in the host memory; a second segment of host memory containing contiguous addressable storage locations including a location for storing a starting address of the first segment of host memory; and a processor located within the adapter for determining the location of a selected descriptor in response to the starting address and an index contained within the command received by the adapter, the index identifying the selected descriptor located in the first segment of host memory, the processor also determining the location of the data in a selected one of the named data buffers in response to the address information contained in the selected descriptor. As a result of this invention, the adapter can access the data from the non-contiguous addressable storage locations in host memory.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
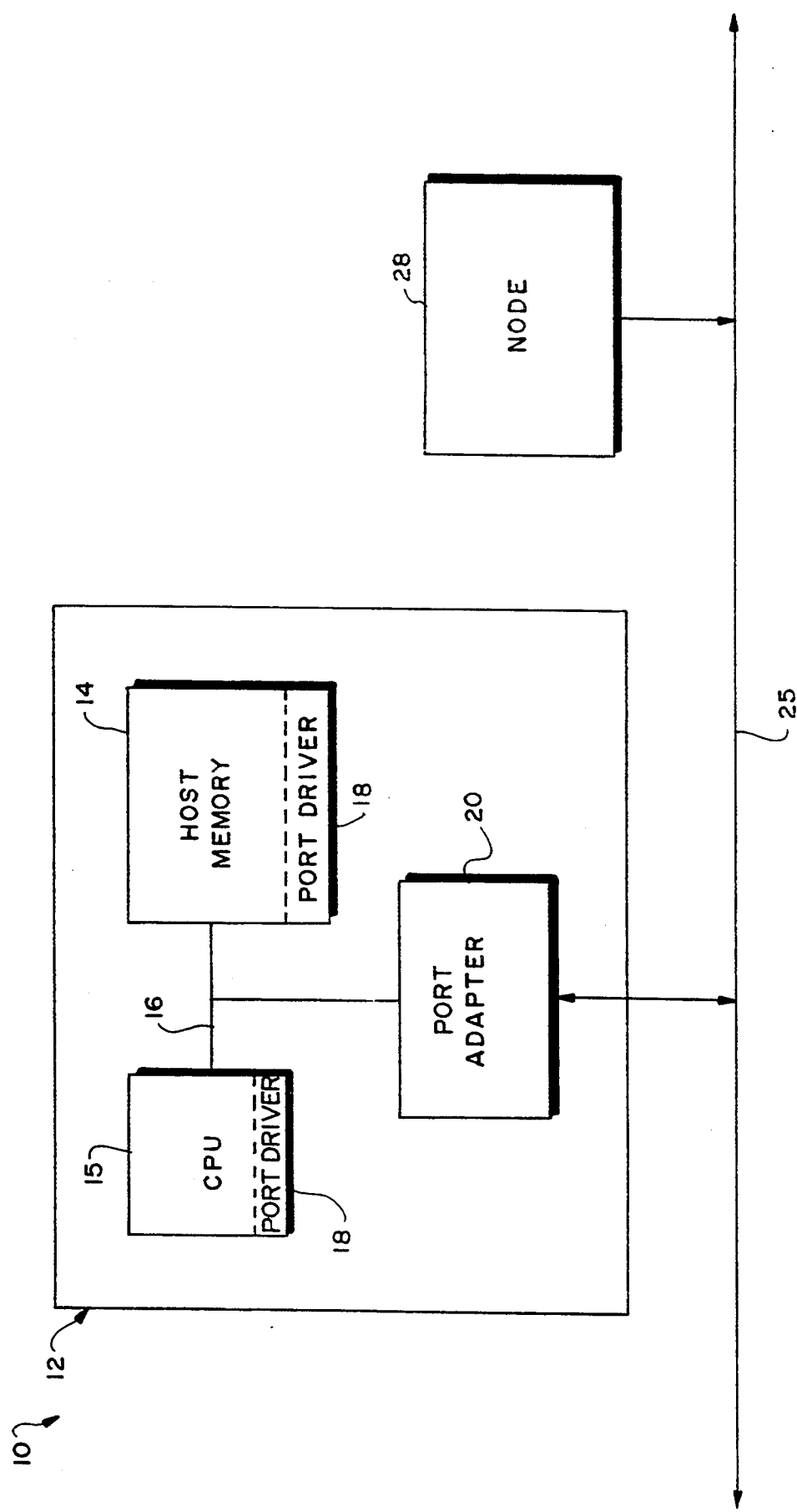
FIG. 1 is a diagram of a data processing system including a node connected to a host computer having an I/O port adapter, a CPU and a memory for storing at least portions of a port driver operating system program that is executed by the CPU.

Referring to FIG. 1, a data processing system 10 includes a host computer 12 connected to at least one node 28 via an interconnect medium 25. Node 28 may be another host computer or a peripheral device, such as a disk drive, whereas the interconnect medium 25 is typically a network or an input/output (I/O) bus. The host computer 12 may comprise a central processing unit (CPU) 15, a host memory 14 and at least one I/O port adapter 20 interconnected by a system bus 16. The host memory 14 may comprise storage locations typically composed of random access memory (RAM) devices, which are addressable by the CPU and port adapter. An operating system, portions of which are typically resident in memory 14 and executed by CPU 15, functionally organizes the computer 12. The operating system includes, inter alia, a port driver 18 executed by the CPU 15 to control the port adapter 20. The driver 18 is responsible for invoking I/O operations in support of programs executing in the CPU 15. The driver 18 and port adapter 20 communicate by "reading" and "writing" various data structures resident in the host memory 14. It is to be understood that the CPU 15 performs the actual read and write operations on behalf of the driver, whereas the port adapter 20 incorporates the necessary "intelligence", e.g., a processor, to perform similar operations itself.

If, for any reason, the host computer 12 desires to communicate with the node 28, the port driver software issues an appropriate I/O message, e.g., a command, to the adapter 20. The port adapter 20 interprets the command received from the driver 18, executes it by, for example, forwarding it to the appropriate node on the medium 25, and then responds to the port driver 18, if necessary. Later, the port adapter 20 may receive a derivative of the command from node 28 including, for instance, data requested by the host computer 12; alternatively, the node 28 may pass to the port adapter a command requesting that the adapter 20 return data to the node 28 from host memory 14 in response to the command. Because the command contains a logical designation for the data buffer in host memory 14, i.e., the name of the data buffer, the adapter 20 transfers the data directly to the appropriate buffer location and notifies the port driver 18. In accordance with the present invention, the port adapter uses buffer descriptor structures and pointers described herein to access the named data buffer locations in host memory 14.

Figure 2:
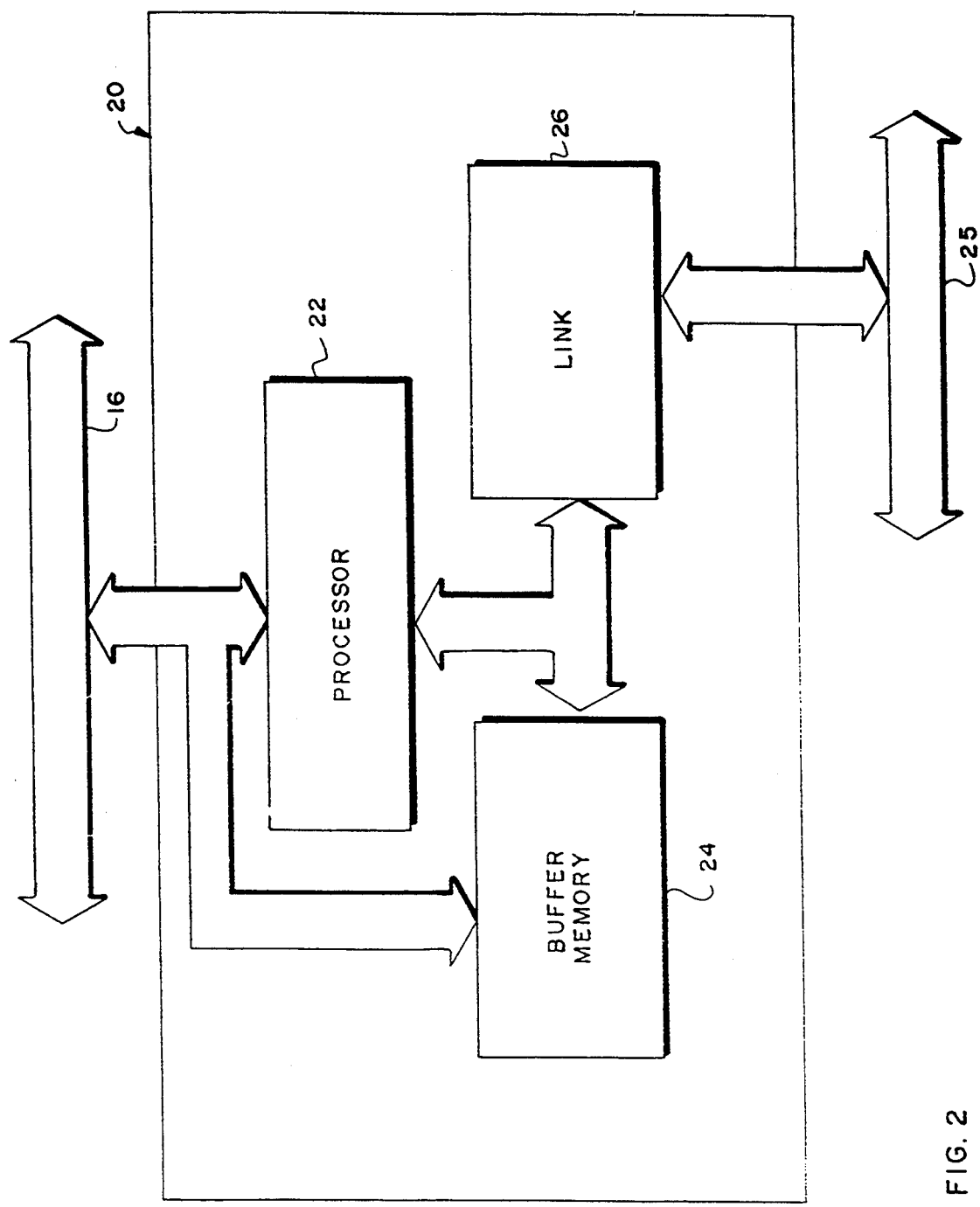
FIG. 2 is a diagram of the I/O adapter of FIG. 1.

As shown in FIG. 2, the port adapter 20 may include a processor 22, a buffer memory 24 and a link 26. The processor 22 performs read and write operations in data structures in host memory 14 (FIG. 1) that are used to exchange information with the driver 18. The processor 22 may also perform arithmetic operations to locate the named data buffers, as described below. Accordingly, to perform its operations, the processor 22 communicates with the host memory 14, and controls the buffer 24 and link 26. The buffer memory 24 functions as a "cache" to provide temporary storage of information normally resident in host memory 14; that information may then be quickly accessed by the processor 22 without referencing the host memory 14. The link 26 typically comprises state devices and transceivers that physically connect the port adapter to the interconnect medium 25. In addition, the link is typically responsible for implementing the lower levels of the interconnect medium protocol and moving information between the medium 25 and buffer memory 24.

As described herein, the buffer descriptor arrangement provides a mapping technique that allows the port adapter 20 to "view" host memory in "port pages" when accessing a named data buffer, which may consist of many port pages. Specifically, the memory mapping arrangement apportions host memory 14 into equal-sized port pages for use by the port adapter. The named data buffer typically comprises non-contiguous physical locations in host memory 14. The size of a port page is independent of the page size as viewed by the CPU; preferably, it is 8 KB (kilobytes) and naturally aligned on an 8 KB boundary in host memory 14, i.e., address bits $<12:0> = 0$. However, it is to be understood that other port page sizes may be used within the teachings of the invention. Accordingly, a named data buffer may span multiple port pages.

Figure 3:
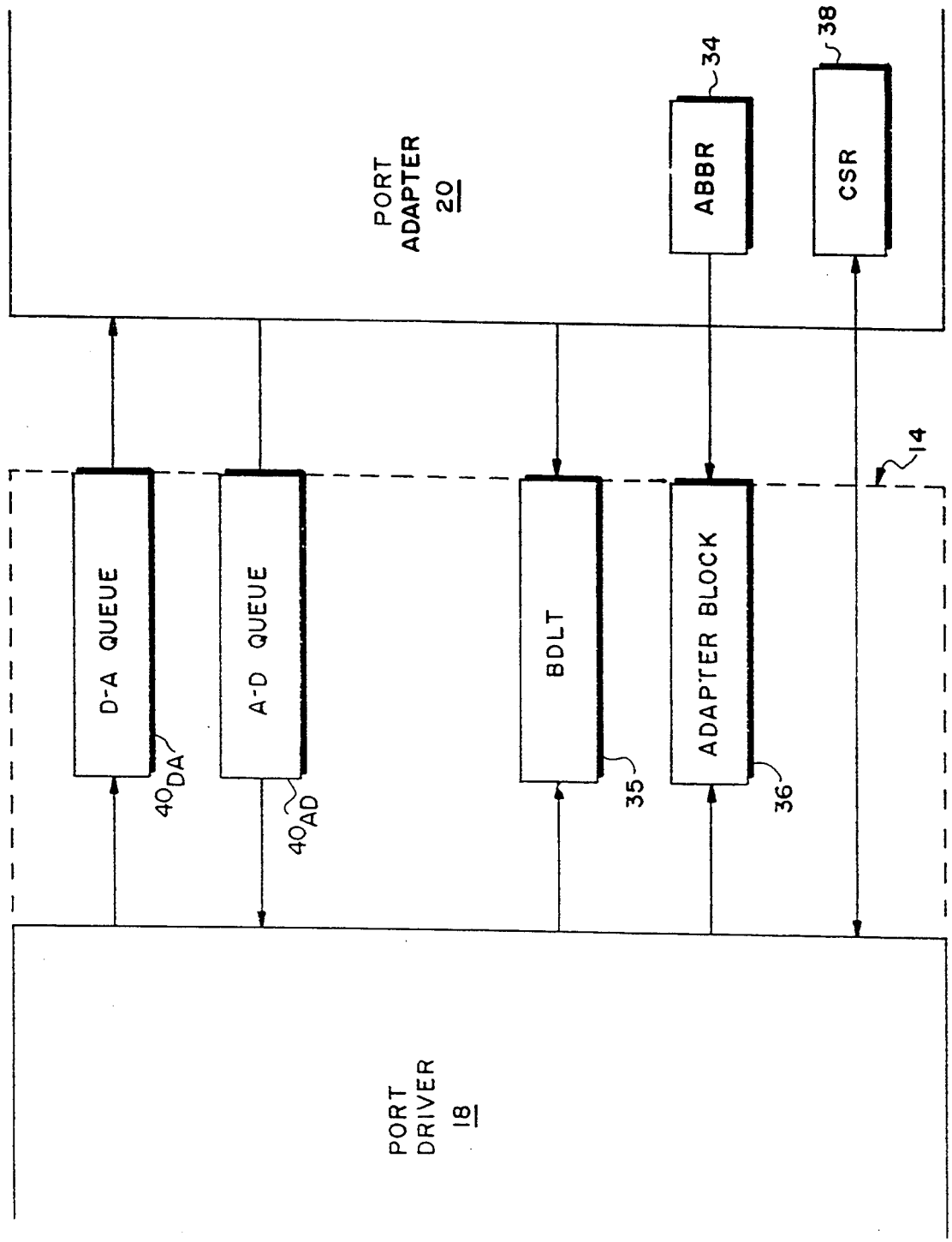
FIG. 3 is a diagrammatic representation of a communication interface used to pass commands and responses between the port driver and adapter.

FIG. 3 depicts a logical interface for exchanging information between the driver 18 and the port adapter 20. As can be seen, the interface may comprise various data structures in the host memory 14 and may include registers located in the port adapter 20. Specifically, the structures may include: (i) a buffer descriptor leaf table (BDLT) 35 comprising a table of buffer descriptor leaves, each containing a number of named buffer descriptors used by the adapter to move data directly between messages and named data buffers in host memory; (ii) an adapter block (ADAPTER BLOCK) 36 comprising a data structure used by the port adapter and port driver to locate the structures described herein; (iii) an adapter block base register (ABBR) 34 comprising a register containing the host memory physical address of the adapter block 36; and (iv) control/-status registers (CSR) 38 used by the port driver to convey initialization and control information to the port adapter, and used by the adapter to convey interrupt and error status information to the port driver. In addition, the structures may include: (v) at least one driver-adapter (D-A) queue $40_{DA}$ used by the port driver to pass messages to the port adapter; and (vi) at least one adapter-driver (A-D) queue $40_{AD}$ used by the port adapter to pass responses to the port driver.

Portions of the BDLT 35 and adapter block 36 are preferably resident in host memory 14, but they may be copied to the port adapter buffer memory 24 (FIG. 2). The addresses of the ABBR 34 and CSR registers 38 are preferably in the port adapter's I/O address space. The data structures shared between the port driver 18 and port adapter 20, e.g., the BDLT 35 and the adapter block 36, are accessed with virtual addresses by the port driver 18 and with physical addresses by the port adapter 20.

More specifically, as noted above, the port driver 18 issues a message to the port adapter 20 when the CPU 15 either requests a data transfer from or to a node 28. The port driver may use a singly-linked queue in the host memory 14 to pass the message to the adapter. In general, the singly-linked queue may comprise a header element and a stopper entry, with message entries linked therebetween. To facilitate access to the entries as between the port adapter and port driver, a dual addressing-arrangement is utilized that comprises complex address pointers (having virtual and physical address portions) within the queue entries. Examples of the singly-linked queue and addressing technique used to access the queue entries are described in copending and commonly assigned U.S. patent applications titled QUEUE APPARATUS AND MECHANICS FOR A COMMUNICATIONS INTERFACE ARCHITECTURE, U.S. Ser. No. 07/869,648 of Lary et al. and DUAL ADDRESSING TECHNIQUE FOR A COMMUNICATIONS INTERFACE ARCHITECTURE, U.S. Ser. No. 07/870,491 of Willard et al., both of which are filed on even date herewith and are expressly incorporated herein by reference as though fully set forth herein.

In general, a typical message/command, such as a return data (RETDAT) command or send data (SENDAT) command, contains the name of the data buffer involved in the particular transaction. The port adapter 20 uses the name to find the location of the buffer in host memory 14. Typically, only portions of the data can be sent or returned during a single transfer. Therefore, a transaction will often involve multiple transfers; accordingly, transfer length and transfer offset information are also included within the command. This information facilitates the transfer of data, since the port adapter can directly access a buffer location to send the data to an appropriate node in response to a SENDAT command from the driver. Similarly, when a node returns requested data in response to a RETDAT command, the buffer name and transfer information are included so that the port adapter can directly store the data in host memory 14.

Figure 4:
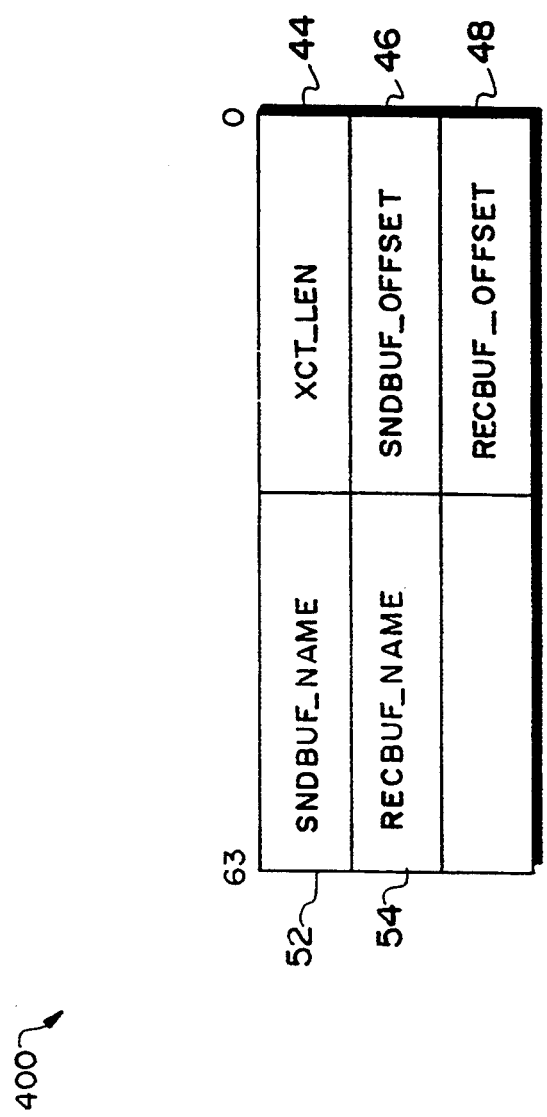
FIG. 4 illustrates a preferred format of a typical command exchanged between the port driver and adapter.

A preferred format for a RETDAT command or a SENDAT command is shown in FIG. 4. Specifically, the command format 400 may include a transaction length (XCT_LEN) field 44 indicating the length of the data transfer in bytes. A SNDBUF_NAME field 52 identifies the sending buffer, while a SNDBUF_OFFSET field 46 specifies the starting byte of the transfer relative to byte 0 of the sending buffer. Similarly, a RECBUF_NAME field 54 identifies a receiving buffer location and a RECBUF_OFFSET field 48 specifies the starting byte of the receiving area relative to byte 0 of the receiving buffer.

If, for example, the CPU 15 requests a 64 KB block of data from a node, e.g., a disk drive, the disk may return the data in separate 4 KB transfers and in arbitrary order depending on the relative locations of the data on the disk. As described in detail below, the port adapter 20 locates the data buffer in host memory with the SNDBUF_NAME 52. In addition, the adapter uses the SNDBUF_OFFSET 46 contents to identify the relative starting location of each 4 KB transfer within the buffer, and the XCT_LEN 44 contents to determine the transfer size, i.e., 4 KB in this example.

Figure 5A:
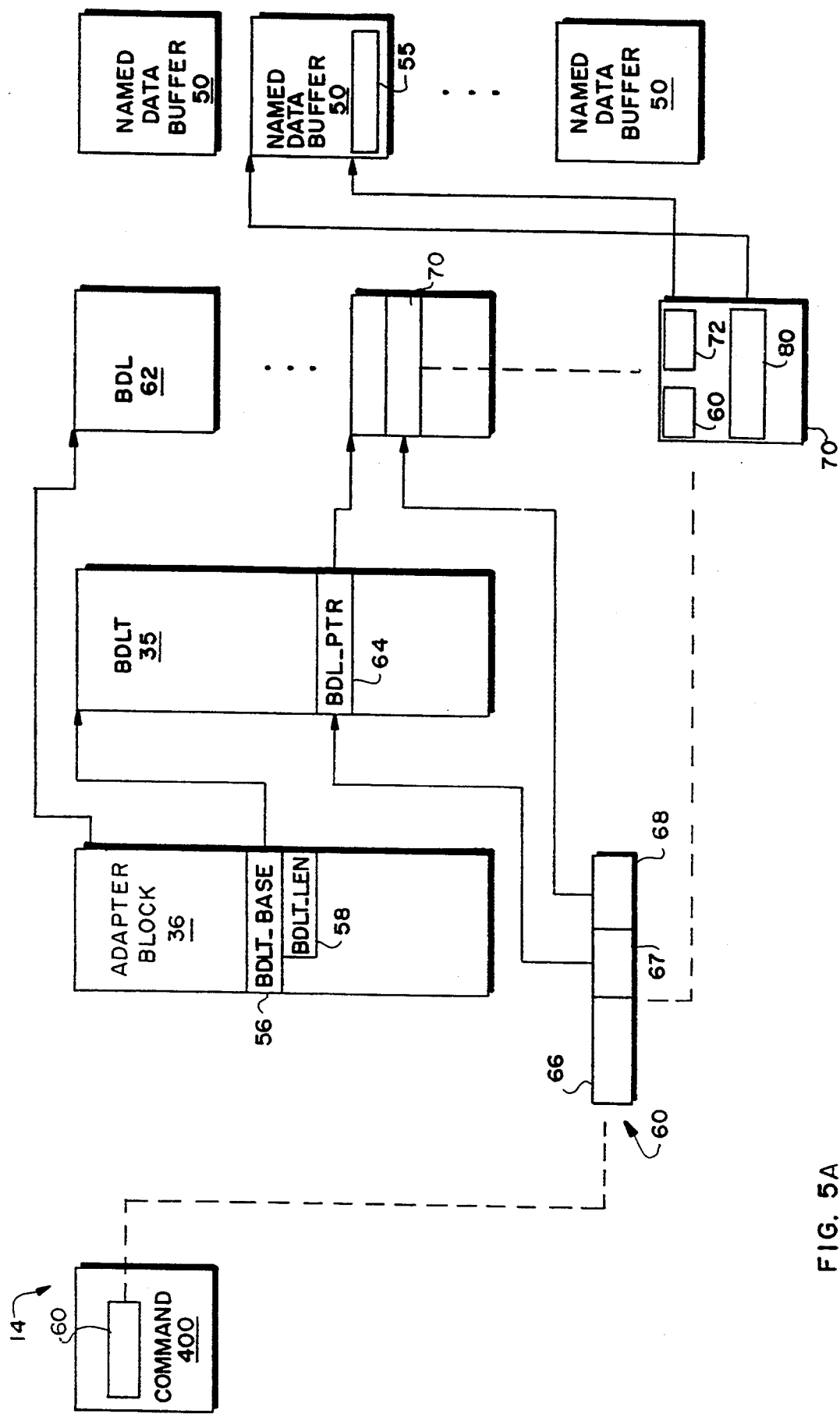
FIG. 5A depicts a preferred embodiment of a memory mapping system provided by buffer descriptor structures and pointers in accordance with the invention.
Figure 6A:
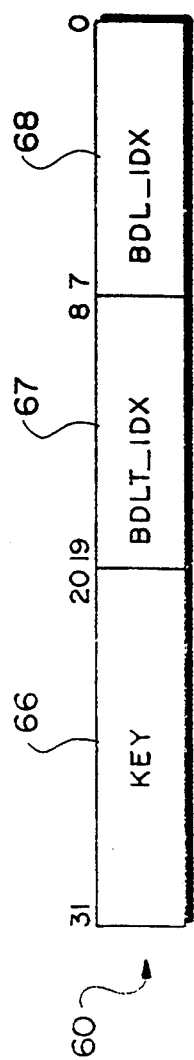
FIG. 6A illustrates the contents of a buffer name field contained within the command of FIG. 4.

FIG. 5A depicts a preferred embodiment of a memory mapping system in host memory 14 provided by the buffer descriptor structures and pointers in accordance with the invention. A buffer name, e.g., SNDBUF_NAME 52 or RECBUF_NAME 54 (FIG. 4), is used to locate buffer descriptors, shown generally at 70, which are then used to identify locations 55 within a named data buffer 50. Referring also to FIG. 6A, the contents of a buffer name field (BUF_NAME), shown generally at 60 and similar in content to SNDBUF_NAME 52 and RECBUF_NAME 54, contains a key field 66, a BDLT_IDX field 67 and a BDL_IDX field 68. The key 66 provides a mechanism to reduce the probability of an incorrect access to a buffer, i.e., the key field 66 must match a corresponding key field in a buffer descriptor. The key also allows reuse of the descriptor. That is, by changing the key and other associated fields, a particular buffer descriptor can be used for different transactions. The BDLT_IDX 67, i.e., an index identifying a location in the BDLT 35, and the BDL_IDX 68, i.e., an index identifying a location in the buffer descriptor leaf (BDL) 62, are used to locate the buffer descriptor 70. The port adapter 20 typically acquires the BDLT base address (BDLT_BASE) 56 from a predetermined, formatted location within the adapter block 36.

Figure 6B:
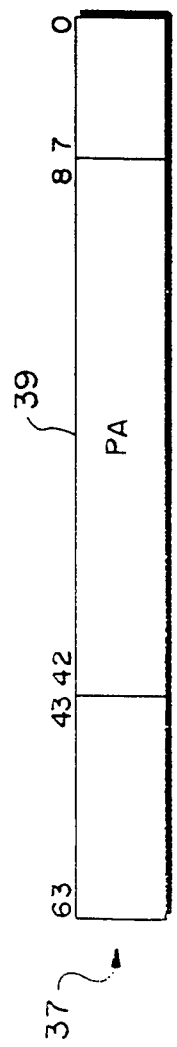
FIG. 6B illustrates a preferred format of an adapter block base register used in accordance with the invention.

Specifically, the port adapter 20 accesses an adapter block 36 in host memory 14 using the contents of ABBR 34 (FIG. 3); however, other embodiments of the invention may employ equivalent register means for accessing the adapter block, such as a general purpose register. As noted, the host computer 12 may include more than one port adapter 20; for such a configuration, each adapter 20 typically has its own adapter block 36. A preferred format of the ABBR 34 is depicted in FIG. 6B. Preferably, the bits <42:8> of physical address (PA) field 39 of the ABBR 34 corresponds to bits <47:13> (not shown) of the physical address of the base of the adapter block 36 (FIG. 3); bits <12:0> of the ABBR 34 are zero because the adapter block 36 is a physically contiguous, port page-aligned segment of host memory. At system initialization, the port driver 18 provides the physical address stored in field 39.

Referring again to FIG. 5A, an entry, i.e., BDLT_BASE 56, of the adapter block 36 contains the starting (base) physical address of the BDLT 35, while another entry BDLT_LEN 58 contains the length of the BDLT in bytes. Therefore, for this particular embodiment of the invention, the BDLT 35 is the base structure used to locate a named data buffer. The BDLT is allocated at system initialization and may, for example, contain up to 4096 BDL pointers (BDL_PTRs) 64, each of which contains a physical address pointing to the starting address of a BDL 62. The BDLT 35 is also a port page aligned structure. It may be up to 8 port pages in length, yet must be a physically contiguous segment of host memory 14.

In operation, the port adapter 20 examines the BUF_NAME 60 located in a command 400; it obtains the BDLT_IDX 67 and adds it to the BDLT_BASE 56 to determine the address of a BDL_PTR 64 in the BDLT 35. The BDL_PTR 64 is then obtained and added to the BDL_IDX 68 to direct the port adapter to a buffer descriptor 70. The adapter may then access address pointers and offsets contained in the descriptor 70 to similarly determine the locations 55 of data in a named data buffer 50. The buffer descriptor 70 contains a replication of the BUF_NAME 60 as an added check. As described below in connection with FIG. 7, the port adapter typically compares the contents of the BUF_NAME 60 with the replication to verify the named data buffer 50 thus selected.

Figure 5B:
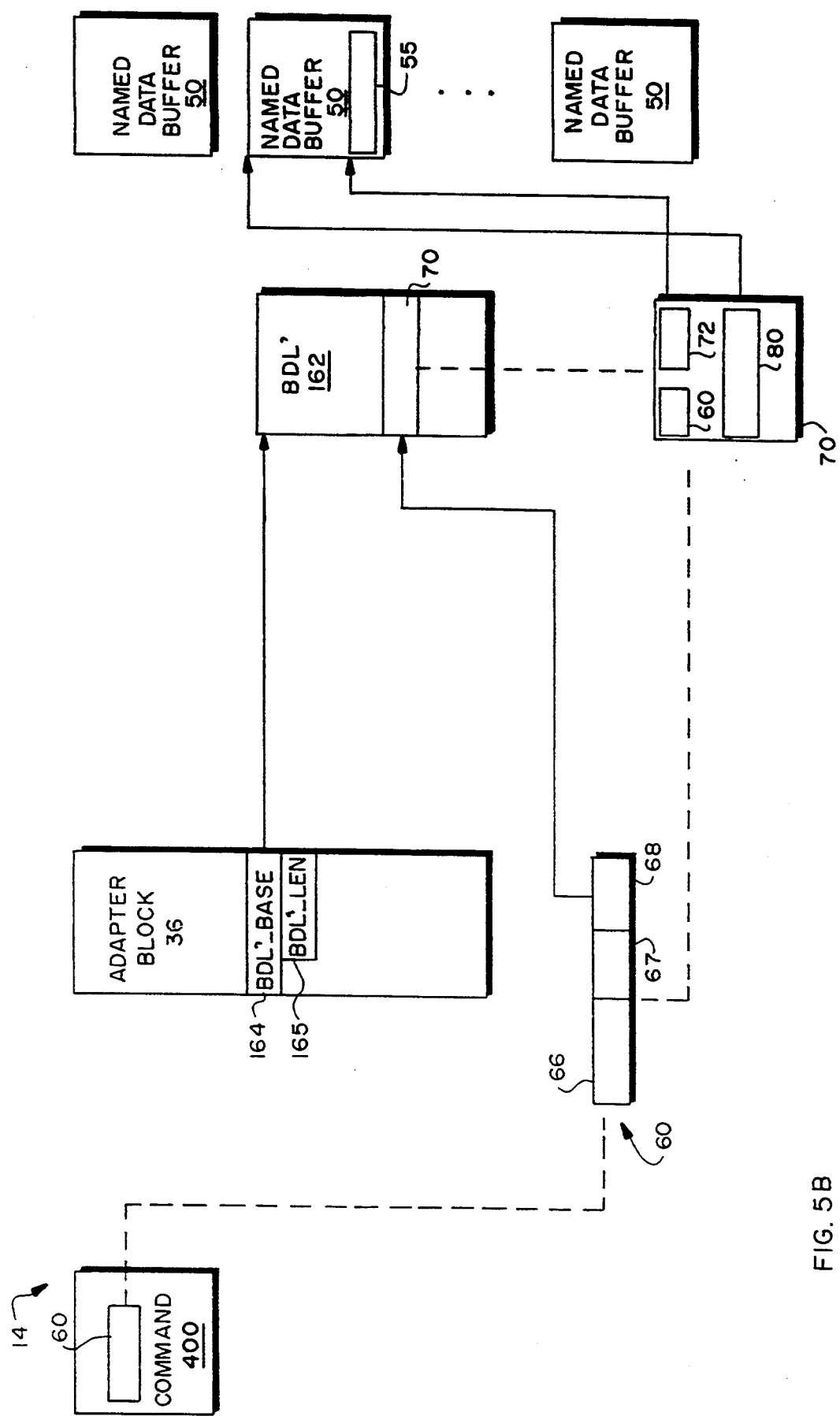
FIG. 5B depicts a preferred alternate embodiment of the memory mapping system provided by buffer descriptor structures and pointers in accordance with the invention.

FIG. 5B depicts a preferred alternate embodiment of a mapping system in host memory. This system obviates the need for a BDLT 35 by employing a physically contiguous array of buffer descriptors that is functionally equivalent to a BDL 62 data structure, described below. The equivalent structure, generally designated BDL' 162, may be of arbitrary length and is regarded as the base structure used to locate a named data buffer. For this embodiment, the adapter block 36 preferably includes an entry, i.e., BDL'_BASE 164, containing the starting physical address of the BDL' 162 and another entry BDL'_LEN 165 containing the length of the BDL'. The BDL_IDX 68 of the BUF_NAME 60 provides an index into the BDL' 162 and the BDLT_IDX 67 is not used. Accordingly, the port adapter may access a buffer descriptor 70 in a manner similar to that described above.

Referring again to FIG. 5A, the port adapter 20 will generally "cache", i.e., maintain, in its buffer memory 24 (FIG. 2) some number of BDL_PTRs 64 of the BDLT 35; therefore, the port adapter need perform only one read operation to the BDL 62 in host memory 14 to access a buffer descriptor 70 once the buffer name is obtained.

In the case of a multiple port adapter configuration, the BDLT_BASE 56 may be the same in each adapter block 36; that is, the pointers identified from the adapter block eventually locate the same set of named data buffers. Since each port adapter 20 may access each buffer, this type of sharing allows "striping" to occur across many adapters and nodes 28, e.g., disks. Striping involves dividing the storage of a data buffer between disks. Each port adapter may use the same BDLT 35, BDL 62 and buffer descriptor 70 to save locations in host memory 14.

Figure 6C:
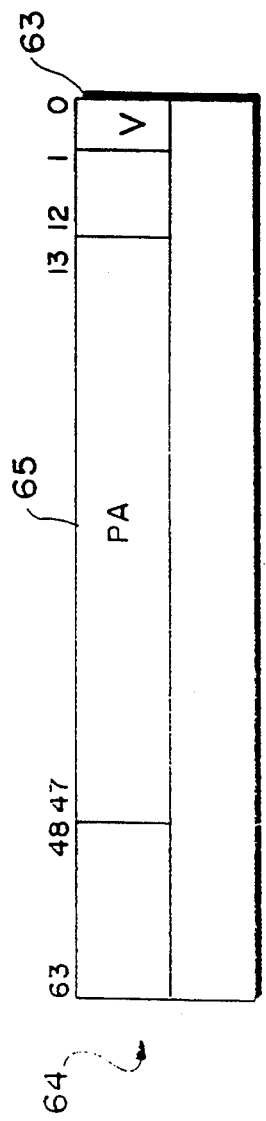
FIG. 6C illustrates the contents of a buffer descriptor leaf pointer in accordance with the invention.

Each BDL 62 is a segment of host-memory one port page in length and contains a physically contiguous array of 256 buffer descriptors 70. Moreover, each BDL 62 is typically located by a BDL_PTR 64, the contents of which is shown in FIG. 6C. Each BDL_PTR contains a valid flag (V-bit) 63 and a PA field 65 containing bits <47:13> of the physical address of the BDL 62. The V-bit 63 provides a mechanism to reduce the probability of an access to a non-existent location in host memory 14 due to a corrupt buffer name. If the V-bit is set, the PA field 65 points to a port page in host memory 14. The port adapter 20 should verify that the V-bit 63 is set prior to attempting to access the BDL 62.

Figure 7:
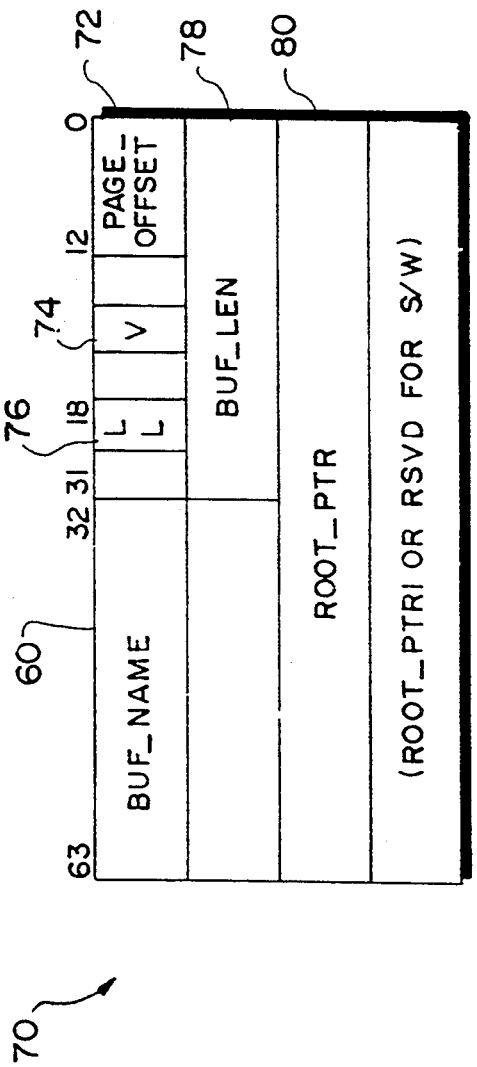
FIG. 7 illustrates a preferred format of a buffer descriptor in accordance with the invention.

A preferred format of a buffer descriptor 70 is shown in FIG. 7. The PAGE_OFFSET field 72 represents the address of the starting byte of a named data buffer 50 relative to byte 0 of the base (starting) port page of the buffer. The V-bit field 74 contains a valid bit that, when set, specifies that the buffer 50 is accessible and that the remaining fields of the buffer descriptor 70 contain valid information. Specifically, the port driver 18 fills in the appropriate fields of the buffer descriptor to open a buffer and then sets the V-bit 74. At this point, the buffer descriptor 70 and the associated buffer mapping pointers, i.e., root buffer pointers and any associated buffer pointers as described below, are "owned" by the port adapter 20 for the duration of the transaction, and, thus, may be cached by the port adapter. However, any cached buffer descriptors and associated pointers are implicitly invalidated (by the adapter) at the end of the transaction.

The LL field 76 contains a "long-life" bit; if set, the information cached by the port adapter 20 may be retained across multiple data transactions. In other words, when a node 28 indicates the end of a particular data transaction, the port adapter may continue to retain the buffer descriptor pointers, i.e., retain them longer than the duration of the transaction, until the port driver 18 explicitly invalidates them. In a preferred embodiment, the port driver may explicity invalidate one or all "long-life" buffer descriptors and associated pointers by sending an invalidate translation cache command (not shown) to the port adapter.

The BUF_NAME field 60 occupies bits <63:32> and has a format similar to that shown in FIG. 6A. The BUF_NAME 60 and V-bit 74 provide additional mechanisms to reduce the probability of an access to a nonexistent port page in host memory 14 due to a corrupt buffer name. If the V-bit 74 is set, the contents of the buffer descriptor fields are valid. Procedurally, the port adapter 20 typically verifies that the V-bit 74 is set and then compares the BUF_NAME fields 60 of the command 400 and buffer descriptor 70 to verify that they match prior to attempting to utilize a root buffer pointer 80.

The BUF_LEN field 78 contains the length of the named data buffer 50 in bytes. The root buffer pointer (ROOT_PTR) field 80 contains an address used to access a named data buffer 50. The additional ROOT_PTR1 field is used for a TYP0 root buffer pointer, as described herein.

The format of a ROOT_PTR 80 is similar to that of a buffer pointer, BUF_PTR, as described below. Specifically, a ROOT_PTR 80 is the first pointer in a possible hierarchy of buffer pointers used to locate a data buffer 50. One or two ROOT_PTRs may be contained within a buffer descriptor 70; two ROOT_PTRS are used by the port adapter only when they both are TYP0 ROOT_PTRs.

Figure 8:
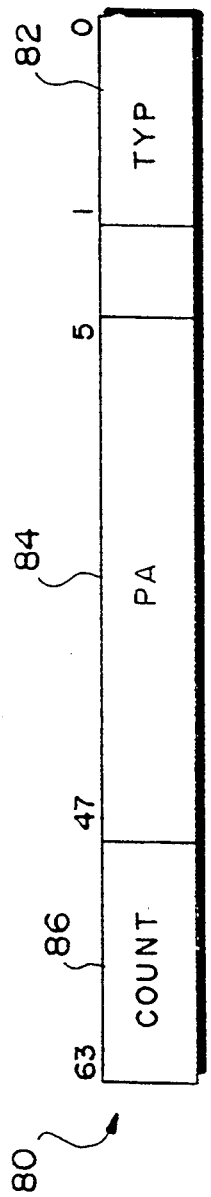
FIG. 8 illustrates a preferred format of a buffer pointer in accordance with the invention.

A preferred format of a ROOT_PTR 80 (and BUF_PTR) is depicted in FIG. 8. Each pointer, hereinafter generally designated 80, identifies a port page in host memory 14 and, as such, has a format that includes a 2-bit TYP field 82 identifying the pointer type and a PA field 84 containing bits <47:5> of the physical address of the port page. In general, the invention supports two buffer description policies: hierarchical pointers and scatter-gather pointers. The hierarchical pointers operate on port pages of a named data buffer 50 and include different pointer types, TYP0, TYP1, and TYP2 pointers, as described further herein. These pointers provide an added level of indirect addressing that permits efficient support of large named data buffers, e.g., up to 4 GB (gigabytes). In contrast, the scatter-gather pointers, i.e., TYP3 pointers, operate on physically contiguous segments of a buffer. Scatter-gather pointers permit arbitrary memory access patterns.

Figure 9A:
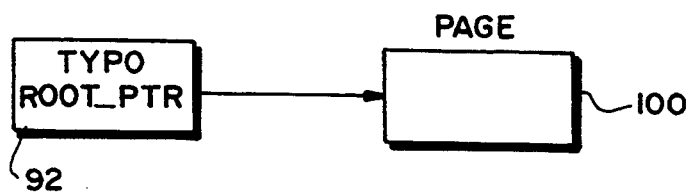
FIGS. 9A-9D illustrate various hierarchal pointer arrangements in accordance with the invention.
Figure 9B:
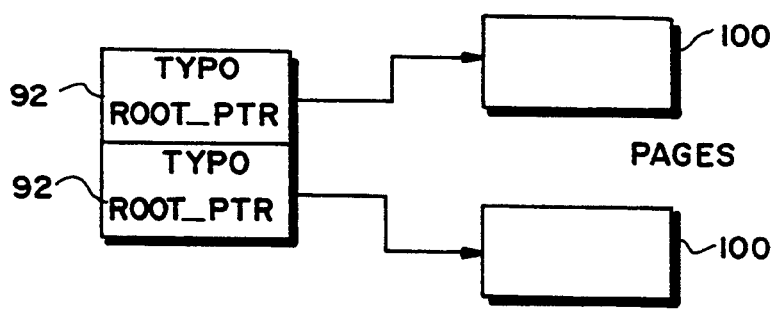

Interpretation of the address contents of the PA field 84 is dependent upon the TYP field 82. Refer generally to FIGS. 9A-9D. For example in FIG. 9A, the PA field 84 of a TYP0 pointer (TYP0 ROOT_PTR) 92 contains the starting physical address of a port page 100 of the data buffer 50 (FIG. 5); in FIG. 9C, the PA field of a TYP1 pointer (TYP1 ROOT_PTR) 94 contains the starting physical address of a packed array of TYP0 BUF_PTRs 95; and in FIG. 9D, the PA field of a TYP2 pointer (TYP2 ROOT_PTR) 96 contains the starting physical address of a packed array of TYP1 BUF_PTRs 97. A common situation described below involves the transfer of data to a named buffer 50 that spans two port pages 100; this is handled by use of two TYP0 ROOT_PTRs 92, as shown in FIG. 9B.

Two TYP0 ROOT_PTRs 92 are used where a buffer 50 spans two port pages 100 and the data transfer size is not greater than the size of a single port page. The port driver 18 may determine whether to use a TYP1 ROOT_PTR 94, and thus allocate a TYP0 BUF_PTR array 95, by way of a buffer length test and need not verify the physical alignment of the buffer 50. If a pair of TYP0 ROOT_PTRs 92 are used, the port adapter 20 may access all the pointers with a single read operation of the buffer descriptor 70; additional accesses to a TYP0 BUF_PTR array 95 are thus unnecessary. Two TYP0 ROOT_PTRs 92 may also be used in a less common situation where a buffer spans two port pages and the data transfer size is between the size of one and two port pages.

Figure 10:
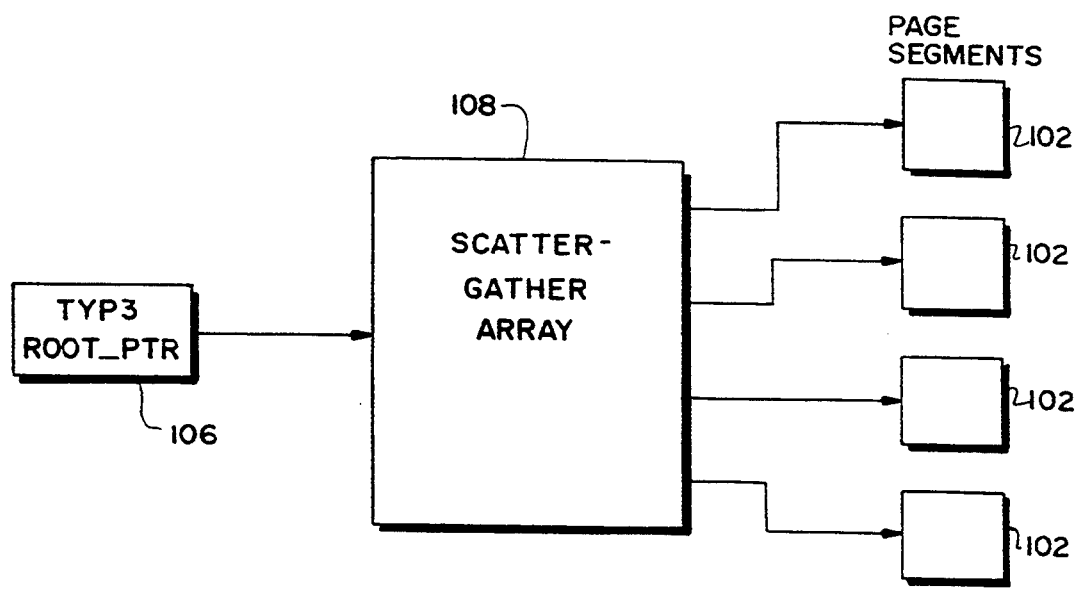
FIG. 10 illustrates a scatter-gather pointer arrangement in accordance with the invention.

In the same manner and referring to FIG. 10, the PA field 84 of a TYP3 pointer (TYP3 ROOT_PTR) 106 contains the physical address of a packed array of scatter-gather pointers 108. FIG. 10 illustrates the scatter-gather pointer arrangement. It should be noted that the COUNT field 86 of the BUF_PTR 80 (FIG. 8) is valid for only TYP3 ROOT_PTRs 106; it contains the number of entries in the scatter-gather BUF_PTR array 108.

As noted above, for a transaction involving multiple transfers, the port adapter 20 may cache in its buffer memory 24 a valid BDL_PTR 64 to obviate many of the references to host memory 14 when accessing the BDL 62. The adapter may also cache a BUF_PTR 80, since a request to a node 28, e.g., a disk drive, for data may result in multiple data transfers. When the node completes the entire transaction, the port adapter 20 invalidates any cached BUF_PTRs 80. The port driver 18 may also explicitly invalidate these cached entries by issuing an invalidate translation cache command to the port adapter 20.

Also as noted, the interpretations of a ROOT_PTR 80 and any BUF_PTRs 80 are dependent upon the pointer TYP field 82. In all cases, a transfer offset (XFER_OFFSET bits <31:0> below) may be obtained by adding the PAGE_OFFSET 72 of the buffer descriptor 70 (FIG. 7) to the SNDBUF_OFFSET 46 or RECBUF_OFFSET 48 of a command 400 (FIG. 4):

XFER_OFFSET=(SND_OFFSET or REC_OFFSET)+PAGE_OFFSET

The use of a pointer TYP field 82 depends upon the size of the buffer for a particular transaction. For example, if the named data buffer 50 is physically contiguous and does not span multiple port pages 100, the buffer may be located by a single TYP0 ROOT_PTR 92 (FIG. 9A). Here, the PA field 84 of the ROOT_PTR 80 contains the physical address of a segment of a buffer. The address (XFER_BASE_PA bits <63:0>) of the first byte of a named buffer data transfer is obtained by adding the contents of the PA field 84 to the XFER_OFFSET:

XFER_BASE_PA=(8192 * ROOT_PTR <47:13>)+XFER_OFFSET <12:0> where, 8192 represents the size (in bytes) of a port page in the preferred embodiment of the invention.

For the single TYP0 situation, bits <12:5> of the PA field 84 of the ROOT_PTR 80 and XFER OFFSET bits <31:13> are zero. The BUF_LEN 78 of the named buffer must be less than or equal to 8192 (the size of a port page) and the named buffer may not cross a port page boundary.

As an extension of the above, two TYP0 ROOT_PTRs 92 (FIG. 9B) are used when the buffer spans two port pages. This situation frequently arises when a small buffer is virtually, but not physically, contiguous. Specifically, the port adapter 20 performs one read operation of the buffer descriptor 70, validates the buffer and thus has the two physical address TYP0 ROOT_PTRs to access the pages 100 of the data buffer.

The PA field 84 of each of the two ROOT_PTRs 80 contains bits <47:5> of the physical address of a buffer segment. The address of the first byte of a named buffer data transfer is obtained by adding the appropriate PA field to the transfer offset:

IF (XFER_OFFSET > 8192) THEN
XFER_BASE_PA = (8192 * ROOT_PTR1 <47:13>) +

XFER_OFFSET <12:0>

ELSE
XFER_BASE_PA = (8192 * ROOT_PTR <47:13>) +

XFER_OFFSET <12:0>

END IF

For the two TYP0 pointers situation, PA bits <12:5> of the ROOT_PTR 80 and XFER_OFFSET bits <31:14> are zero. The total BUF_LEN must be less than or equal to 16384 (the size of two port pages).

Figure 9C:
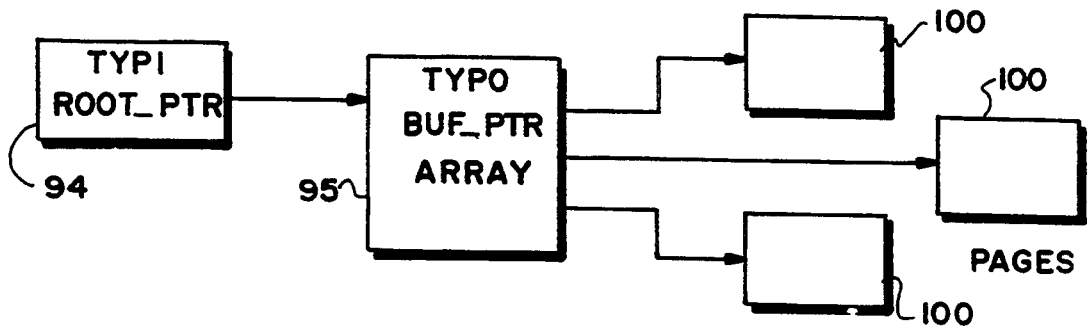
Figure 9D:
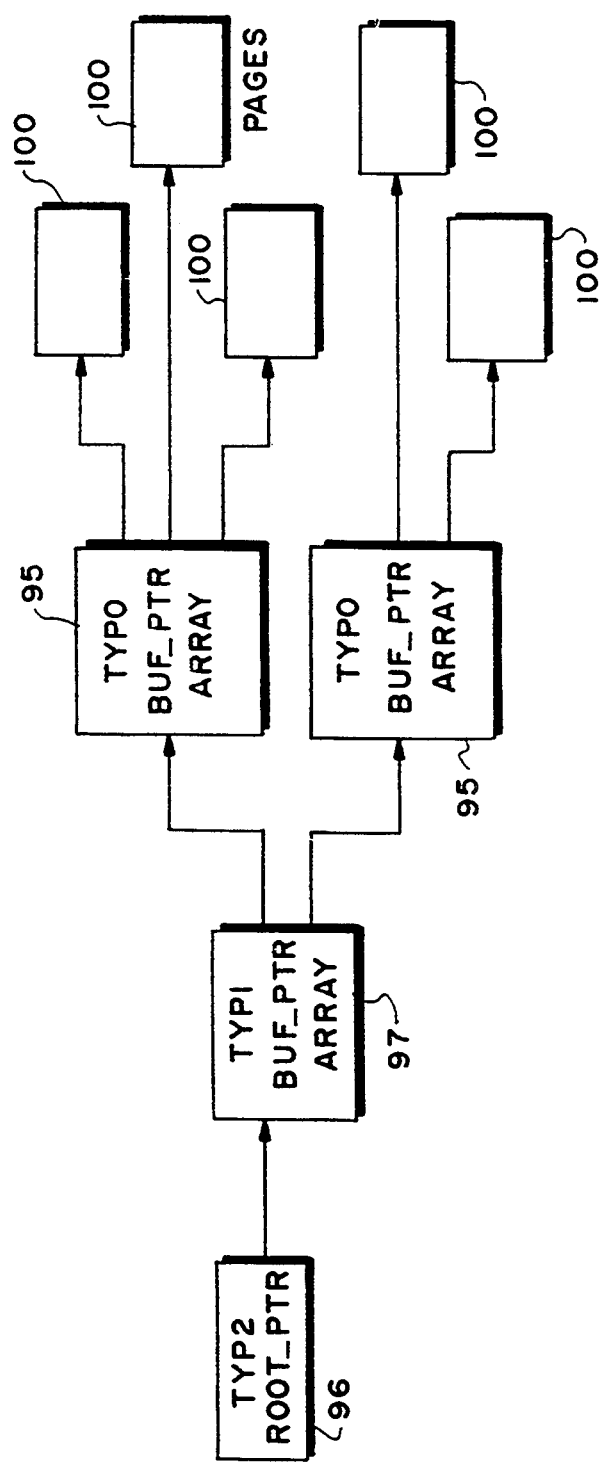

On the other hand, if the named data buffer is too large to be described by one or two TYP0 ROOT_PTRs, it may be located by an array of such pointers using one TYP1 ROOT_PTR 94 (FIG. 9C). Here, the PA field 84 of the ROOT_PTR 80 contains the address of a physically contiguous packed array of TYP0 BUF_PTRs 95. The address of the first byte of a named buffer data transfer is obtained by extracting bits <22:13> of the XFER_OFFSET and multiplying them by 8 (to convert from an index of an array to an address offset from the base of that array), and then adding the product to the PA field 84. The result is the address of a TYP0 pointer:

XFER_TYP0_PA=(32*ROOT_PTR <47:5>)+(8*XFER_OFFSET <22:13>)

For the TYP1 situation, the TYP0 array 95 must be physically contiguous and hexword, i.e., 32 byte, aligned; thus, ROOT_PTR <47:5> is multiplied by 32. The port adapter 20 then fetches the pointer. The PA field of this TYP0 pointer is then added to bits <12:0> of the XFER_OFFSET:

XFER_BASE_PA=(8192*XFER_TYP0 <47:13>)+XFER_OFFSET <12:0>

The BUF_LEN of the named buffer 50 must be less than or equal to the size of a port page multiplied by the number of pointers which may be contained in a port page and XFER_OFFSET bits <31:23> must be zero.

A TYP2 ROOT_PTR 96 (FIG. 9D) may be required if the buffer is too large to be described by an array of TYP0 buffer pointers. The PA field 84 of the ROOT_PTR 80 contains the address of a physically contiguous packed array of TYP1 BUF_PTRs 97. The address of the first byte of a named buffer data transfer is obtained by first extracting bits <31:23> of the XFER_OFFSET and multiplying them by 8, and then adding the product to the PA field 84 of the ROOT_PTR 80. The result is the address of a TYP 1 pointer, which is fetched by the port adapter 20:

XFER_TYP1_PA=(32*ROOT_PTR <47:5>)+(8*XFER_OFFSET <31:23>)

Next, bits <22:13> of the XFER_OFFSET are extracted and multiplied by 8; this product is added to the PA field of the TYP1 pointer to obtain the address of the TYP0 pointer. The port adapter 20 then fetches that pointer:

XFER_TYP0_PA=(32*XFER_TYP1 <47:5>)+(8*XFER_OFFSET <22:13>)

Finally, the PA field of the TYP0 pointer is added to bits <12:0> of the XFER OFFSET:

XFER_BASE_PA=(8192*XFER_TYP0 <47:13>)+XFER_OFFSET <12:0>

For the TYP2 pointer situation, the TYP1 array 97 must be physically contiguous and hexword aligned. In addition, the entries in each TYP0 array 95 must be physically contiguous and hexword aligned. With the exception of the final TYP0 array, each TYP0 array 95 must be one port page in length and may not cross a port page boundary. The BUF_LEN of the named buffer is limited to less than 4 GB by the 32-bit size of the SNDBUF_OFFSET 46 or RECBUF_OFFSET 48 in the command 400 (FIG. 4).

Large data buffers may be located with TYP2 ROOT_PTRs 96. Specifically, a TYP2 ROOT_PTR is useful for moving large memory arrays, e.g., larger than 8 MB, as when "striping" disks. Since striping may be performed with different port adapters, the same buffer descriptor 70 describing a named data buffer 50 is accessed concurrently or non-coherently by the adapters. This is acceptable because the buffer descriptor is a read-only structure with respect to the port adapter. However, the XFER_OFFSETs and XFER_LENs used by the port adapters would be different, e.g., a first port adapter handles the first 4 KB transfer of the transaction, a second port adapter handles the next 4 KB transfer of the transaction, and so on.

As noted, the scatter-gather pointers support arbitrary memory access patterns (FIG. 10). The TYP3 ROOT_PTR 106 points to the base of an array of length-address pointer pairs, i.e., a scatter-gather array 108, used to locate individual segments 102 of a buffer 50. Each buffer segment 102 may be as large as 64 KB in length and arbitrarily aligned, but may not cross a 64 KB boundary.

Figure 11:
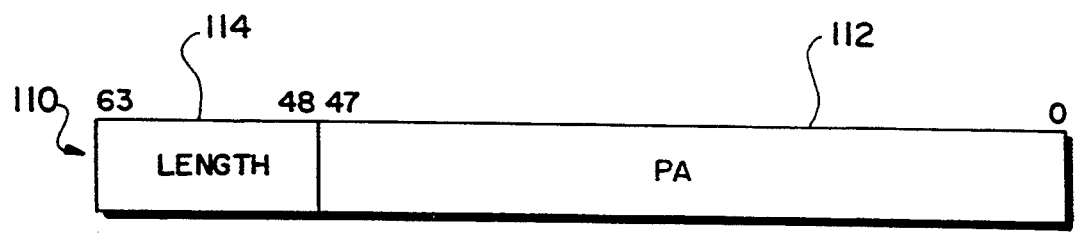
FIG. 11 illustrates a preferred structure and contents of a scatter-gather array element in accordance with the invention.

FIG. 11 illustrates the structure and contents of a scatter-gather array element 110. The PA field 112 contains bits <47:0> of the physical address of the buffer segment 102, while the LENGTH field 114 contains the length of the segment in bytes. The length-address pointer array 108 must be physically contiguous and hexword aligned. As noted above, the number of active entries is specified by the COUNT field 86 of the BUF_PTR 80.

In accordance with the invention, the exchange of buffer names and the associated validation allows the transfer of data with arbitrary lengths between nodes on a communication medium without knowledge of the memory mapping policies, i.e., page sizes, of the nodes. Furthermore, the port adapter may transfer data directly between host memory and the nodes; no CPU memory-to-memory copying is required. The named buffer descriptors can also be shared across port adapters performing striped data transfers.

Although the data buffers and descriptor structures described herein have memory locations that typically are contiguous in virtual address space, they tend to occupy addresses that are disjoint in physical address space. Accordingly, the invention provides an efficient means of locating these physically non-contiguous structures. In addition, the invention allows the port adapter to access arbitrary locations within a named data buffer in an efficient manner. This is because nodes on the communication medium do not always return data in a sequential order. For example, disks often return data in an order which optimizes seek efficiency; the returned data may be in any order.

In summary, the buffer descriptor pointers of the invention support named buffer transfers efficiently, yet flexibly. For a typical transfer of 8 KB or less, the port adapter need perform only one overhead memory operation to access the buffer descriptor. All pointers needed to locate the buffer descriptor may be "cached" by the port adapter. The buffer descriptor contains all information necessary to validate the buffer name and locate the named data buffer, even in the common situation of a buffer which crosses two physical pages. The architecture described herein supports up to 4 GB transfers. The adapter may cache any part of the buffer descriptor or packed pointer arrays, thus efficiently supporting out-of-order transfers.

The foregoing description has been directed to specific embodiments of this invention. It will be apparent, however, that variations and modifications may be made to the described embodiments, with the attainment of some or all of their advantages. Therefore, it is the object of the appended claims to cover all such variations and modifications as come within the true spirit and scope of the invention.

What is claimed is:

1. A system for accessing data located in a host memory comprising:

at least one named data buffer containing addressable storage locations in said host memory;

a first addressable storage region for storing a plurality of descriptors, each descriptor containing physical address information identifying the location of one of said at least one named data buffer in said host memory;

a second addressable storage region including a location for storing a starting address of said first addressable storage region; and a processor located within a port adapter for determining the location of a selected descriptor in response to said starting address and an index contained within a command received by said port adapter, said index identifying said selected descriptor located in said first addressable storage region, said processor also determining the location of said data in a selected one of said at least one named data buffer in response to said physical address information contained in said selected descriptor, such that said port adapter accesses said data from non-contiguous addressable storage locations in said host memory.

2. The system of claim 1 wherein said first addressable storage region is a contiguous array of buffer descriptors.

3. The system of claim 2 wherein said second addressable storage region is an adapter block comprised of contiguous addressable storage locations.

4. A memory mapping system for apportioning a host memory into a plurality of port pages for use by a port adapter when accessing data in said host memory, said memory mapping system comprising:

at least one named data buffer comprising addressable storage locations in said host memory;

first contiguous storage means for storing a plurality of buffer descriptors, each buffer descriptor containing physical address information and physical offset information identifying the location of one of said at least one named data buffer in said host memory;

second contiguous storage means for storing a plurality of buffer descriptor pointers, each buffer descriptor pointer containing a first starting address of said first contiguous storage means in said host memory;

third contiguous storage means located in said host memory for storing a second starting address of said second contiguous storage means in said host memory; and processor means located within said port adapter for determining the location of said data in a selected one of said at least one named data buffer in response to said physical address information and said physical offset information contained in a selected buffer descriptor, said processor means further comprising:

(i) means for determining the location of a selected buffer descriptor pointer in response to said second starting address and a first index, said first index contained within a message and identifying said selected buffer descriptor pointer stored in said second contiguous storage means;

(ii) means for determining the location of said selected buffer descriptor in response to said first starting address and a second index, said second index contained within said message and identifying said selected buffer descriptor stored in said first contiguous storage means, such that said port adapter accesses said data from non-contiguous addressable storage locations of said at least one named data buffer in said host memory.

5. The system of claim 4 wherein said physical address information contained in said buffer descriptor is a root pointer containing the physical starting location of a selected port page of said host memory.

6. The system of claim 5 wherein said physical offset information contained in said buffer descriptor is used by said processor means to determine the physical starting location of said data stored in said at least one named data buffer relative to the physical starting location of said selected port page.

7. The system of claim 4 wherein said physical address information contained in said buffer descriptor is a root pointer containing the physical starting location of an array of first pointers, each of which contain the physical starting location of one of said plurality of port pages of said host memory.

8. The system of claim 7 wherein said physical offset information contained in said buffer descriptor is used by said processor means to determine the physical address of a selected first pointer.

9. The system of claim 4 wherein said physical address information contained in said buffer descriptor is a root pointer containing the physical starting location of an array of second pointers, each of said second pointers containing the physical starting location of an array of first pointers, each of said first pointers containing the physical starting location of one of said plurality of port pages of said host memory.

10. The system of claim 4 wherein said physical address information contained in said buffer descriptor is a root pointer containing the physical starting location of an array of third pointer pairs, each of said third pointer pairs containing the physical starting location of a segment of said at least one named data buffer in said host memory.

11. In a data processing system including an external node coupled to a host computer including a central processing unit (CPU), a host memory and an I/O port adapter, a mapping method for apportioning said host memory into a plurality of port pages for use by said port adapter when accessing data stored in named data buffers in said host memory in response to a message received from one of said CPU and said external node, said named data buffers generally comprising addressable storage locations in said host memory, said mapping method comprising the steps of:

storing a plurality of buffer descriptors in a first contiguous storage location segment of said host memory, each buffer descriptor containing physical address information and physical offset information identifying the location of one of said named data buffers in said host memory;

storing a plurality of buffer descriptor pointers in a second contiguous storage location segment of said host memory, each buffer descriptor pointer containing a first starting address of said first contiguous storage location segment;

storing a second starting address of said second contiguous storage location segment in a third contiguous storage location segment of said host memory;

determining the location of a selected buffer descriptor pointer in response to said second starting address and a first index, said first index contained within said message and identifying said selected buffer descriptor pointer stored in said second contiguous storage location segment;

determining the location of a selected buffer descriptor in response to said first starting address and a second index, said second index contained within said message and identifying said selected buffer descriptor stored in said first contiguous storage location segment; and.

determining the location of said data in a selected one of said named data buffers in response to said physical address information and said physical offset information contained in said selected buffer descriptor, such that said port adapter accesses said data from non-contiguous addressable storage locations of said named data buffer in said host memory.

* * * * *